United States Patent [19]
Knauer

[11] Patent Number: 6,148,498
[45] Date of Patent: Nov. 21, 2000

[54] METHOD OF MAKING A BRAKE DRUM RING

[75] Inventor: Joseph L. Knauer, Berea, Ky.

[73] Assignee: Hayes Lemmerz International, Inc., Northville, Mich.

[21] Appl. No.: 09/364,781

[22] Filed: Jul. 30, 1999

[51] Int. Cl.[7] .................................................. B23P 17/00
[52] U.S. Cl. ................... 29/527.7; 188/218 R; 29/407.08
[58] Field of Search .............................. 29/527.7, 407.08; 72/47; 188/218 R

[56] References Cited

U.S. PATENT DOCUMENTS

| | | | |
|---|---|---|---|
| 4,067,098 | 1/1978 | Blair, Jr. ................................. | 29/527.6 |
| 4,262,407 | 4/1981 | Petersen et al. ...................... | 29/527.5 |
| 4,858,731 | 8/1989 | Bush .................................... | 188/218 R |
| 5,285,874 | 2/1994 | Revyn .................................. | 188/218 R |
| 5,782,324 | 7/1998 | Wall ..................................... | 188/218 R |
| 5,948,353 | 9/1999 | Lawrence et al. ..................... | 420/15 |

Primary Examiner—P. W. Echols
Attorney, Agent, or Firm—Marshall & Melhorn

[57] ABSTRACT

The invention is a method of manufacturing a composite drum ring and a composite brake drum having a drum ring. The invention is a method of manufacturing a brake drum ring. An annular band is provided, which is formed by any suitable known method. A cast metal insert is cast in the radially inner surface of the band. Upon casting the molten metal is cooled to an initial solidification temperature to at least partially solidify the molten metal, followed by hot rolling the drum band to reduce the roundness run out of the composite drum ring. The hot rolling operation includes rotating the drum band, providing a roll forming roll and applying the roll forming roll against the radially outer surface of the rotating drum band. A feedback sensor may by provided for determining the roundness run out of the composite drum ring. The hot rolling step may include adjusting the force applied to the roll forming roll in proportion to the roundness run out.

23 Claims, 3 Drawing Sheets

METHOD OF MAKING A BRAKE DRUM RING

BACKGROUND OF INVENTION

The invention relates generally to brake drums, and more particularly to an improved method of manufacturing a composite brake drum ring.

Most wheeled vehicles are provided with a brake system for selectively inhibiting the rotation of the wheels to slow the movement of the vehicle. One type of commonly known vehicle brake system includes a brake drum assembly provided at one or more of the vehicle wheels.

A drum brake assembly includes a hollow cylindrical brake drum secured to the wheel of the vehicle for rotation therewith. The drum includes a radially inner annular braking surface. The drum brake assembly further includes a brake shoe assembly having a pair of arced friction shoes secured to non-rotatable components of the vehicle and disposed in a spaced apart relationship with the drum braking surface. During vehicle braking, the friction shoes are moved into frictional engagement with the braking surface of the drum to inhibit rotation of the drum and its associated wheel.

Brake drums were typically made of gray iron because it provides the resultant drums with sufficient mechanical and physical properties such as hardness, strength, wear resistance, thermal conductivity, and the like. However cast iron is heavy which can be undesirable for use in a vehicle. In an effort to reduce the weight of vehicle components, composite brake drums have been developed which use steel in place of much of the heavier cast iron. Composite brake drums typically include a drum back for mounting the brake drum on a vehicle, and a composite drum ring connected to the drum back. The composite drum ring includes an annular steel band surrounding an annular cast metal insert. The braking surface is formed on the radially inner surface of the annular cast metal insert.

A known method of manufacturing the composite drum ring includes centrifugally casting the cast metal insert in the drum band. A drum band is provided which is preferably formed of steel in a conventional manner, although other suitable materials may be used. The band is formed in a conventional manner to predetermined dimensions. The band is rotated and molten metal, preferably gray iron, is delivered to the radially inner surface of the annular band. Centrifugal force evenly distributes the molten iron along the inside of the band. The band is rotated for another period of time to allow the iron to solidify. The braking surface is then typically formed on the cast iron insert in a known manner such as machining.

Alternatively, the cast metal insert may be statically cast in the band using conventional techniques. For example the band is positioned in a mold apparatus and molten metal, preferably gray iron, is introduced into a mold cavity defined between the mold and the radially inner surface of the band. The iron is cooled to solidification. The braking surface is subsequently formed in a known manner.

It is desirable that the circumference of the finished brake drum ring be round to within predetermined tolerances. Deviations from round, called roundness run out, which are larger than the predetermined tolerances result in the brake drum ring being "out-of-round". A brake drum having an out-of-round drum ring will be imbalanced as it rotates on the vehicle and may exhibit undesirable wear characteristics.

The conventional processes of forming a composite brake drum ring described above result in an excessive number of drum rings that are out-of-round. Additional processing steps are then required to "true" the drum ring thereby bringing it to within the desired tolerances for roundness. For example, it is known to provide the drum ring with additional cast iron which then must be removed to true the drum ring. Alternatively, steel weights are welded to the drum ring to balance the casting. Despite these measures, some of the composite brake drum rings cannot be trued and must be scraped.

It is desirable to provide a method of manufacturing composite brake drum rings which reduces the number of rings that are out-of-round. It is also desirable to reduce the number of composite drum rings that must be scraped.

SUMMARY OF THE INVENTION

The invention is a method of manufacturing a composite brake drum ring. An annular band is provided, which is formed by any suitable known method. A cast metal insert is cast in the radially inner surface of the band. The cast metal is preferably gray iron. The molten iron is delivered to the radially inner surface. The metal insert may be cast by centrifugal casting, static casting or any other known casting method.

The molten metal is cooled to an initial solidification temperature to at least partially solidify the molten iron, followed by hot rolling the drum band to reduce the roundness run out of the drum band. The hot rolling operation includes rotating the composite brake drum band, providing at least one forming roll and applying the roll forming roll against the radially outer surface of the rotating drum band. The roll forming roll preferably has a radially outer surface which is complimentary to the radially outer surface of the composite drum band.

The roll forming step may also include applying a force to the roll forming roll such that the roll forming roll applies a proportional force against the radially outer surface of the rotating drum band thereby reducing the roundness run out of the composite drum band. A feedback sensor may be provided for determining the roundness run out of the composite drum band. The hot rolling step may also include adjusting the force applied to the roll forming roll in proportion to the roundness run out.

The invention has the advantage of improving the roundness of the composite drum ring. A drum ring manufactured in accordance with the invention will exhibit better performance and improved wear. The invention also has the inherent benefits of reducing the amount of machining necessary to produce the composite drum ring and of reducing the amount of molten gray iron to cast a composite drum ring. The invention will reduce the amount of composite drum rings that must be scraped and also reduce the weight of the composite drum ring.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE PREFERRED EMBODIMENT

The present invention relates to a method of manufacturing a brake drum for a motor vehicle or the like. It is to be understood that the specific device illustrated in the attached drawings and described in the following specification is simply an exemplary implementation of the invention defined in the appended claims. Hence, specific dimensions and other physical characteristics relating to the embodiments disclosed herein are not to be considered as limiting, unless the claims expressly state otherwise.

Figure 1:
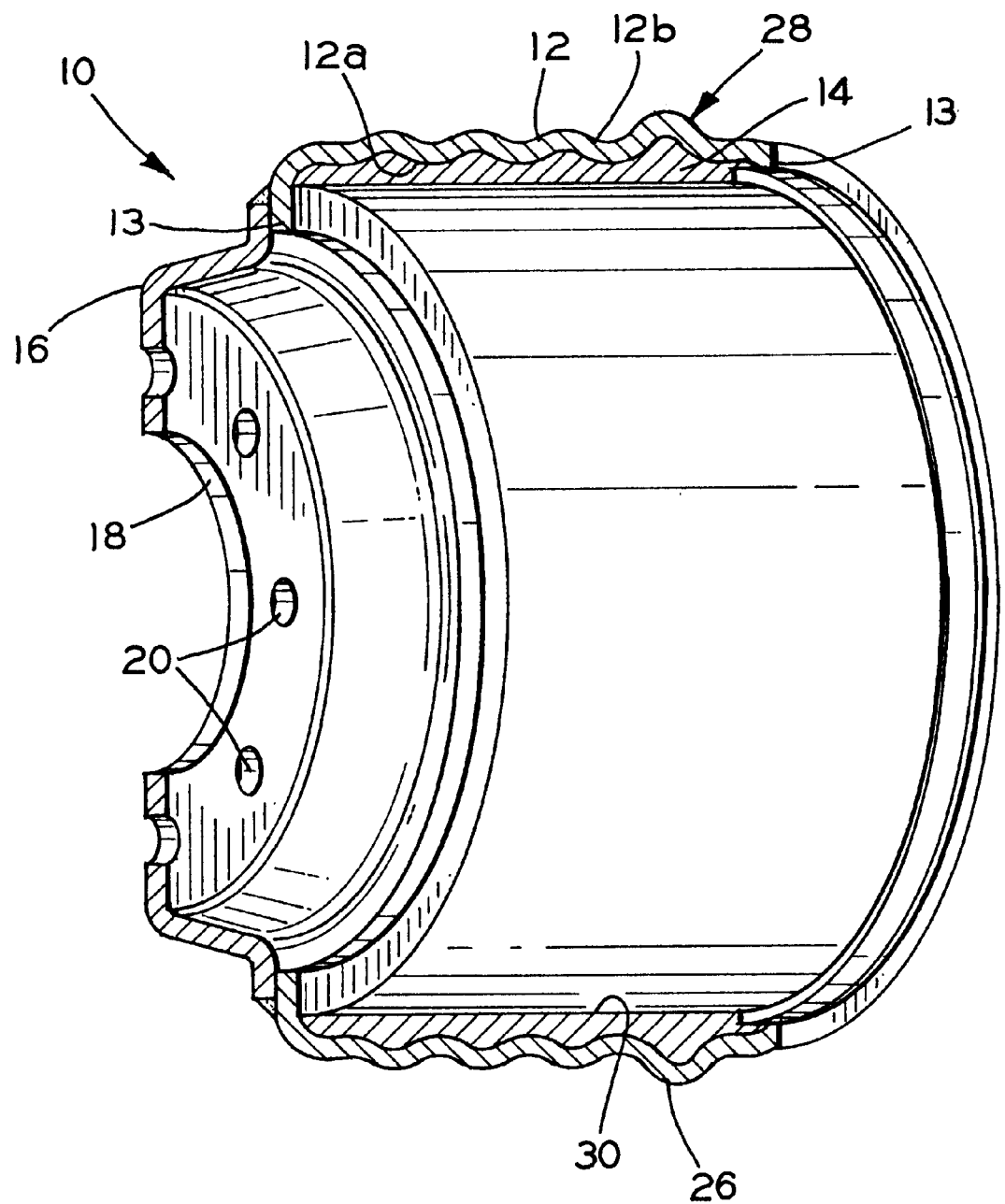
FIG. 1 is a diametrically sectioned perspective view of a finished brake drum manufactured in accordance with the invention.

Referring now to the drawings, there is illustrated in FIG. 1 a composite brake drum formed in accordance with the invention and generally designated by the reference numeral 10. The composite brake drum 10 is comprised of an annular band 12 having a radially inner surface 12a disposed between radially inwardly turned lips 13. The drum band also has a radially outer surface 12b. The drum band 12 is preferably formed of steel, although it may also be formed of aluminum, aluminum MMC, or any other suitable metal. A metal insert 14 is disposed at the radially inner surface of the drum band 12a. The metal insert 14 is preferably formed of gray iron, although any other suitable metal may be used. The metal insert is preferably metallurgically bonded to the drum band 12. The steel band 12 and the gray iron casting 14 together form a composite drum ring 28 having a radially inwardly directed braking surface 30.

A drum back 16 is preferably connected to one edge of the band 12 by welding or any other known method. Alternatively, the band 12 and drum back 16 may be formed integrally, from a single piece of steel. Alternatively, the drum back may be cast and formed integrally with the cast insert. The drum back 16 has openings 18 and 20 for mounting the brake drum 10 in the conventional manner. The steel band 12 includes a plurality of optional, radially outwardly directed strengthening ribs 26.

Figure 2:
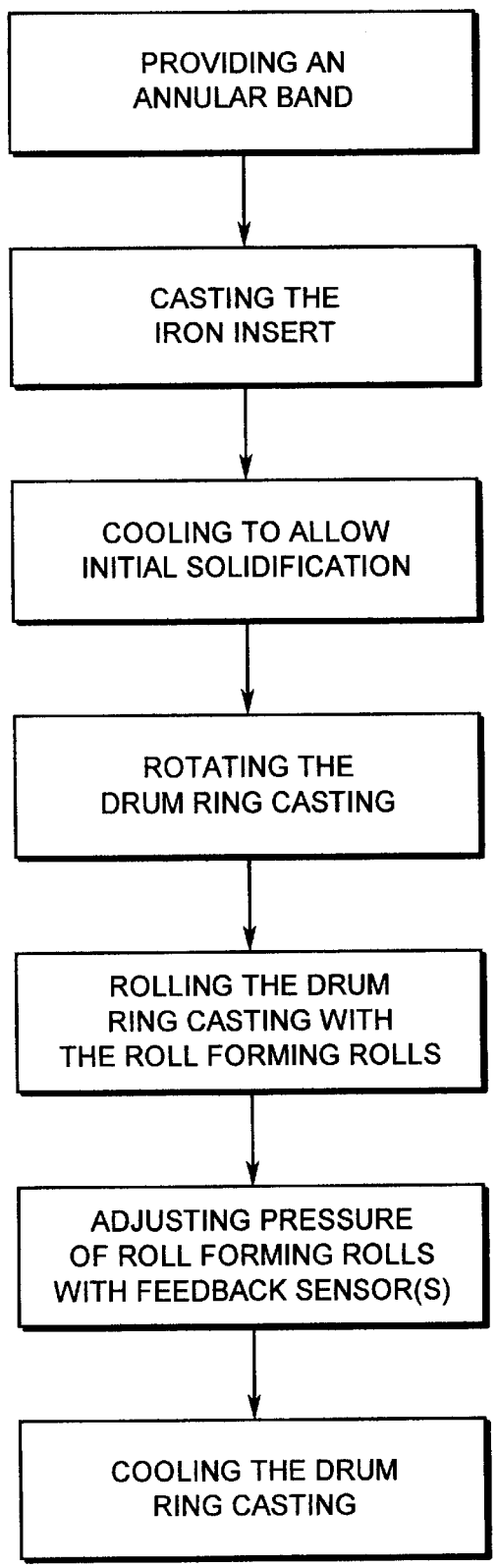
FIG. 2 is a flow chart of the process to manufacture a composite drum ring in accordance with the present invention.

FIG. 2 is a flowchart of the method which is the invention. The annular band 12 is provided which is formed from any suitable known technique such as rolling sheet steel stock to the desired annular configuration. The finished annular band has predetermined dimensions including a predetermined maximum roundness run out.

The iron insert 14 is then cast in the annular band 12 to form the composite brake ring 28. The insert may be cast in any known manner such as static casting or centrifugal casting.

In the preferred embodiment, the insert 14 is centrifugally cast by rotating the band 12 and delivering molten metal to the radially inner surface of the annular band 12a. Gray iron is preferably used for the insert, although any suitable metal may be used. Centrifugal force evenly distributes the molten iron along the inner surface 12a inside of the band.

A liquid flux may optionally be applied to the inner surface 12a of annular band 12 prior to delivering the molten iron. The liquid flux is a material which will enhance the bonding between the annular band 12 and the molten iron. The liquid flux will clean the band 12 and improve the amalgamation and/or bonding with the molten iron. Any suitable type of flux may be used. The liquid flux is typically dried by heating the annular flux coated band to a temperature of approximately 150° F.

The band 12 is then heated to about 900° F. to improve the bonding between the molten iron and the steel. Induction heating is preferably used, although any suitable method of heating may be used. The heated annular band 12 is then rotated by any known means to centrifugally cast the iron insert. In a preferred embodiment the band 12 is mounted on a spin mandrel in any known manner and rotated. Alternatively, the band 12 is chucked on a pour table and rotated.

Molten iron is then delivered to the inner surface of the band 12a. The molten iron poured at a temperature of approximately 2600° F., although any suitable temperature may be used. The annular band 12 is continually rotated during casting to provide the centrifugal force needed to distribute the molten iron.

Alternatively, the insert 14 may be statically cast in any known manner. An example which should not be considered as limiting includes positioning the band 12 in a mold apparatus and delivering molten iron into a mold cavity defined between the mold and the radially inner surface of the band 12a.

The static and centrifugal casting techniques both present a problem in that when the molten iron is delivered to the steel band 12, the high temperature of the molten iron heats the steel band enough to make the band malleable and deformable. The malleable band has the tendency to change shape from the original predetermined dimensions. A common problem is an undesirable increase in the roundness run out of the band. When the cast insert solidifies, the dimensions are set and the ring casting is out-of-round. The roundness run out can change so much that the out-of-round drum ring cannot be trued and must be scrapped.

Figure 3:
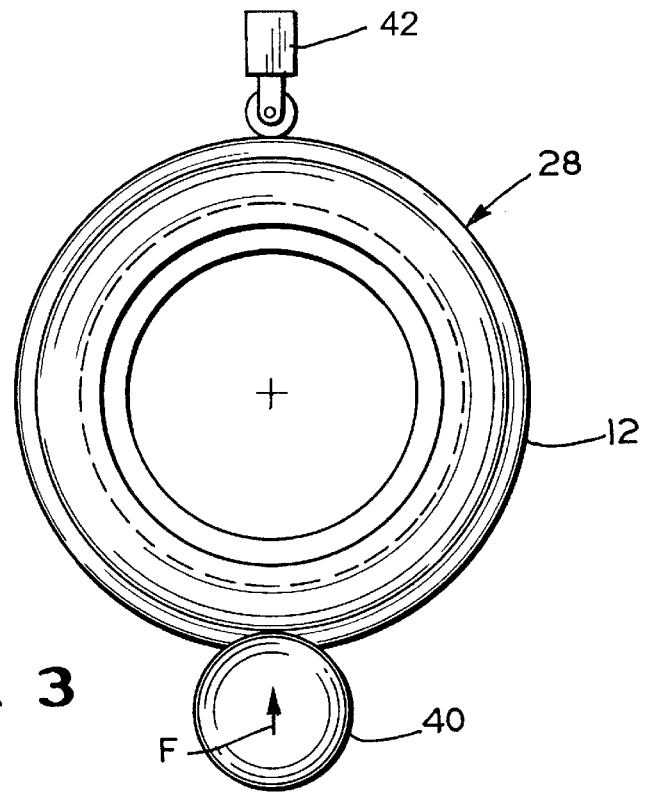
FIG. 3 is a schematic end view of a composite drum ring being hot rolled in accordance with the present invention.
Figure 4:
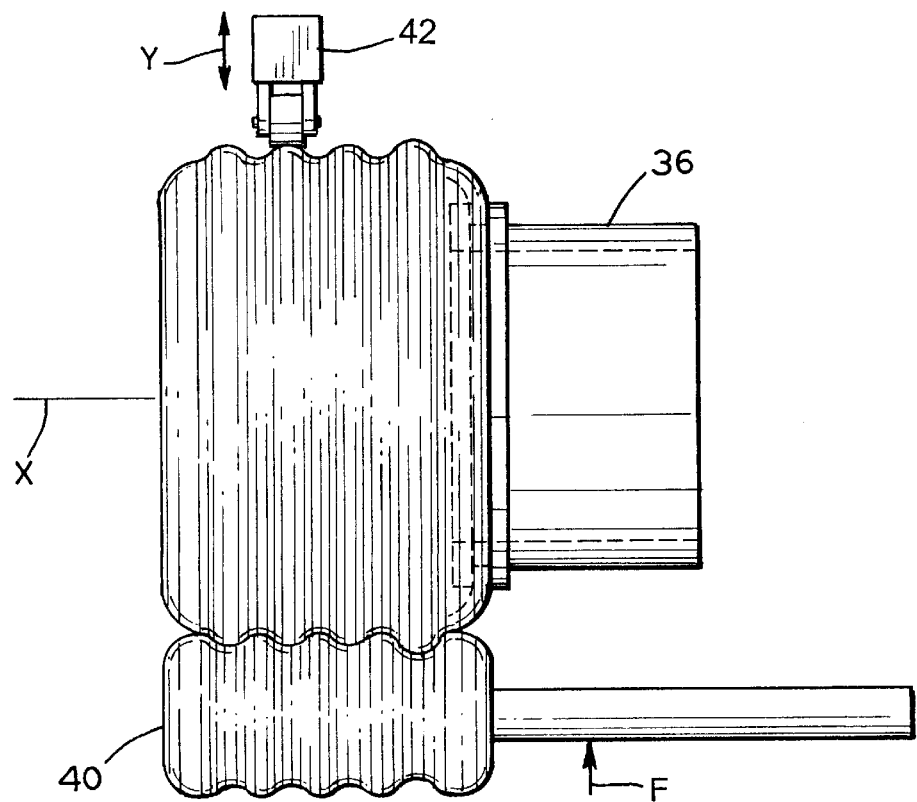
FIG. 4 is a schematic side view of a composite drum ring being hot rolled in accordance with the present invention.

Referring now to FIGS. 2–4, the hot rolling shall be described. After the molten iron is poured in the annular band as described above, the composite drum ring is allowed to cool to an initial solidification temperature. The initial solidification temperature is the temperature at which the molten iron begins to solidify enough that the drum ring can be moved to another machine or fixture if desired. The initial solidification temperature is approximately 2000 to 2200° F. for gray iron, although any suitable temperature may be used. The initial solidification temperature may be different for other suitable insert metals.

At the initial solidification temperature, the steel band 12 is still hot enough to be deformable and the shape of the band can be trued by hot rolling. The drum ring 28 is preferably cooled while it is rotated on a spin mandrel or chuck 36 shown diagrammatically in FIGS. 3 and 4. The drum ring 28 is held by gripping one or both of the lips of the band 13 with a chuck 36. The chuck 36 may grip the band at separate locations around the diameter of the band lips 13 or it may contact one or both of the lips continuously around the lip diameter as shown.

While the drum ring is rotated, at least one roll forming roll 40 is applied against the radially outer surface 12b of the band 12. The roll forming roll 40 has a radially outer surface 40a which is complimentary to the radially outer surface of the drum band 12b. A force F is applied to the roll forming roll 40 such that the roll forming roll applies a proportional force against the radially outer surface of the rotating drum band 12b thereby reducing the roundness run out of the composite drum ring 28.

A feedback sensor 42 preferably provided for determining the roundness run out of the composite drum ring 28. The roundness run out will be apparent as changes in the radius of the band 12 as the drum ring 28 is rotated. The sensor 42 detects the changes as movements towards or away from the drum axis X as shown by arrow Y in FIGS. 3 & 4. Any known sensor capable of measuring roundness run out in this manner may be used. The sensor preferably physically contacts the radially outer surface 12b of the band 12 to detect the run out. Alternatively, a sensor which detects the run out remotely may be used. Any suitable sensor, such as a laser beam, or ultrasonic device may be used.

During the hot rolling operation, the roundness run out of the composite brake ring is reduced by adjusting the force applied to the roll forming roll 40 in proportion to the amount of roundness run out. At the start of the hot rolling operation, the roundness run out will typically be maximum and the sensor will detect the most changes in the radius as the band rotates. The force F applied to the roll forming roll 40 will be correspondingly large. As the roller 40 presses against the radially outer surface of the band the roundness run out is reduced. The reduced run out is detected by the sensor 42 and the force F is correspondingly decreased. This feedback correspondence between the amount of run out detected by the sensor and the force applied to the forming roll 40 is continued until the run out is reduced to acceptable tolerances and the composite drum ring is no longer out-of-round.

The composite drum ring 32 is then cooled to completely solidify the cast iron insert 14. The drum is then optionally cleaned in a known manner, such as by a shot blast unit. Finally the braking surface is machined on the radially inner surface of the insert 14. An additional cleaning step may subsequently be performed.

A drum back is then typically attached to the composite drum ring 28 in any known manner such as welding to form the composite brake drum. Alternatively, the drum back may be formed integrally with the steel band or with the cast insert. Additional machining steps may optionally be performed on the drum back to complete the composite brake rotor.

In accordance with the provisions of the patent statutes, the present invention has been described in what is considered to represent its preferred embodiment, however it should be noted that the invention can be practiced otherwise than as specifically illustrated and described without departing from its spirit or scope.

What is claimed is:

1. A method of manufacturing a composite drum ring, comprising:
   a) providing an annular drum band with a radially inner surface;
   b) delivering molten metal to the radially inner surface to form a composite drum ring;
   c) cooling the molten metal to an initial solidification temperature to at least partially solidify the molten iron; and
   d) hot rolling the composite drum ring to reduce the roundness run out of the drum ring.

2. The method of manufacturing a composite drum ring defined in claim 1 wherein the molten metal is gray iron.

3. The method of manufacturing a composite drum ring defined in claim 1 wherein said hot rolling step (c) includes rotating the drum band, providing a roll forming roll and applying the roll forming roll against the radially outer surface of the rotating drum band.

4. The method of manufacturing a composite drum ring defined in claim 3 wherein said roll forming roll has a radially outer surface which is complimentary to the radially outer surface of the drum band.

5. The method of manufacturing a composite drum ring defined in claim 4 wherein said hot rolling step (c) includes applying a force to the roll forming roll such that the roll forming roll applies a proportional force against the radially outer surface of the rotating drum band thereby reducing the roundness run out of the composite drum ring.

6. The method of manufacturing a composite drum ring defined in claim 5 wherein said hot rolling step (c) includes adjusting the force applied to the roll forming roll in proportion to the roundness run out.

7. The method of manufacturing a composite drum ring defined in claim 4 wherein said hot rolling step (c) includes providing a feedback sensor for determining the roundness run out of the composite drum ring.

8. A method of manufacturing a composite drum ring, comprising:
   a) providing an annular drum band with a radially inner surface;
   b) rotating the annular drum ring;
   b) delivering molten metal to the radially inner surface to centrifugally cast an annular metal insert thereon thereby forming a composite drum ring;
   c) cooling the molten metal to an initial solidification temperature; and
   d) hot rolling the composite drum ring to achieve the desired roundness dimensions.

9. The method of manufacturing a composite drum ring defined in claim 8 wherein the molten metal is gray iron.

10. The method of manufacturing a composite drum ring defined in claim 9 wherein said hot rolling step (c) includes rotating the drum band, providing at least one roll forming roll and applying the roll forming roll against the radially outer surface of the rotating drum band.

11. The method of manufacturing a composite drum ring defined in claim 10 wherein said roll forming roll has a radially outer surface which is complimentary to the radially outer surface of the drum band.

12. The method of manufacturing a composite drum ring defined in claim 11 wherein said hot rolling step (c) includes applying a force to the roll forming roll such that the roll forming roll applies a proportional force against the radially outer surface of the rotating drum band thereby reducing the roundness run out of the drum band.

13. The method of manufacturing a composite drum ring defined in claim 12 wherein said hot rolling step (c) includes providing a feedback sensor for determining the roundness run out of the composite drum ring.

14. The method of manufacturing a composite drum ring defined in claim 13 wherein said hot rolling step (c) includes adjusting the force applied to the roll forming roll in proportion to the roundness run out.

15. A method of manufacturing a composite drum ring, comprising:
   a) providing an annular drum band with a radially inner surface;
   b) delivering molten metal to the radially inner surface while retaining the band in a static condition to form a composite drum ring;
   c) cooling the molten metal to an initial solidification temperature; and
   d) hot rolling the composite drum ring to achieve the desired roundness dimensions.

16. The method of manufacturing a composite drum ring defined in claim 15 wherein the molten metal is gray iron.

17. The method of manufacturing a composite drum ring defined in claim 16 wherein said hot rolling step (c) includes rotating the drum band, providing a roll forming roll and applying the roll forming roll against the radially outer surface of the rotating drum band.

18. The method of manufacturing a composite drum ring defined in claim 17 wherein said roll forming roll has a radially outer surface which is complimentary to the radially outer surface of the drum band.

19. The method of manufacturing a composite drum ring defined in claim 18 wherein said hot rolling step (c) includes applying a force to the roll forming roll such that the roll forming roll applies a proportional force against the radially outer surface of the rotating drum band thereby reducing the roundness run out of the drum band.

20. The method of manufacturing a composite drum ring defined in claim 19 wherein said hot rolling step (c) includes providing a feedback sensor for determining the roundness run out of the composite drum ring.

21. The method of manufacturing a composite drum ring defined in claim 20 wherein said hot rolling step (c) includes adjusting the force applied to the roll forming roll in proportion to the roundness run out.

22. A method of manufacturing a composite brake drum, comprising:

a) providing an annular drum band with a radially inner surface;

b) delivering molten metal to the radially inner surface to form a composite drum ring;

c) cooling the molten metal to an initial solidification temperature to at least partially solidify the molten metal; and d) hot rolling the composite drum ring to reduce the roundness run out of the drum ring.

23. The method of manufacturing a composite brake drum defined in claim 22 wherein said hot rolling step (c) includes rotating the drum band, providing a roll forming roll and applying the roll forming roll against the radially outer surface of the rotating drum band.

* * * * *

UNITED STATES PATENT AND TRADEMARK OFFICE
CERTIFICATE OF CORRECTION

PATENT NO.   : 6,148,498
DATED        : November 21, 2000
INVENTOR(S)  : Joseph L. Knauer It is certified that error appears in the above-identified patent and that said Letters Patent is hereby corrected as shown below:

Column 1,
Line 25, delete "were", add -- are --.

Column 2,
Line 9, delete "scraped", add -- scrapped --;
Line 13, delete "scraped", add -- scrapped --;
Line 52, delete "scraped", add -- scrapped --.

Column 4,
Line 64, after "42", add -- is --.

Column 5,
Line 60, delete "(c)", add -- (d) --.

Column 6,
Line 2, delete "(c)", add -- (d) --;
Line 8, delete "(c)", add -- (d) --;
Line 12, delete "(c)", add -- (d) --;
Line 19, delete "b)", add -- c) --;
Line 23, delete "c)", add -- d) --;
Line 25, delete "d)", add -- e) --;
Line 30, delete "(c)", add -- (e) --;
Line 39, delete "(c)", add -- (e) --;
Line 46, delete "(c)", add -- (e) --;
Line 50, delete "(c)", add -- (e) --;
Line 67, delete "(c)", add -- (d) --.

UNITED STATES PATENT AND TRADEMARK OFFICE
CERTIFICATE OF CORRECTION

PATENT NO. : 6,148,498
DATED : November 21, 2000
INVENTOR(S) : Joseph L. Knauer

It is certified that error appears in the above-identified patent and that said Letters Patent is hereby corrected as shown below:

Column 7,
Line 9, delete "(c)", add -- (d) --;
Line 15, delete "(c)", add -- (d) --;
Line 19, delete "(c)", add -- d --.

Column 8,
Line 16, delete "(c)", add -- (d) --.

Signed and Sealed this

Twenty-fifth Day of September, 2001

*Attest:*

*Attesting Officer*

NICHOLAS P. GODICI
*Acting Director of the United States Patent and Trademark Office*